United States Patent Office 3,499,922
Patented Mar. 10, 1970

3,499,922
DIMERIZATION PROCESS
Julian Feldman and Bernard A. Saffer, Cincinnati, Ohio, assignors to National Distillers and Chemical Corporation, New York, N.Y., a corporation of Virginia
No Drawing. Continuation-in-part of application Ser. No. 271,463, Apr. 8, 1963. This application Mar. 2, 1965, Ser. No. 436,650
Int. Cl. C07c *121/30*
U.S. Cl. 260—465.8     3 Claims The present application is a continuation-in-part of Ser. No. 271,463, filed Apr. 8, 1963.

This invention relates to an improved dimerization process. More particularly, the invention pertains to an improved process for the dimerization of acrylonitrile to produce 2-methylene glutaronitrile.

The parent application describes a catalytic process for the dimerization of acrylonitrile compounds to form unsaturated dinitriles. Utilizing acrylonitrile as the starting material, the dimer product is 2-methylene glutaronitrile having the following structural formula:

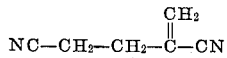

$$NC-CH_2-CH_2-\underset{\underset{CH_2}{\|}}{C}-CN$$

The unique structure of this compound enables it to undergo special addition polymerization and copolymerization reactions. The 2-methylene glutaronitrile is also capable of being selectively hydrogenated to prepare various intermediates as well as diamines and dibasic acids.

The process proposed heretofore involves, in general, dimerizing acrylonitrile compounds, and especially acrylonitrile itself, in the presence of an inert solvent at moderate temperatures using as catalysts tertiary phosphines or adducts of tertiary phosphines with zerovalent nickel catalysts derived from nickel carbonyl to form the unsaturated dinitrile products. Various trialkyl phosphines, tricycloalkyl phosphines, and mixed alkyl aryl phosphines were disclosed in the parent application. The preferred phosphine catalysts were stated to be the trialkyl phosphines or the mixed dialkyl aryl phosphines in which the alkyl group has from about 4 to 8 carbon atoms. The disclosed organic solvents included benzene, xylene, dimethylformamide, acetonitrile and the like. The use of acetonitrile as the preferred solvent was also taught. The parent application further disclosed that an aliphatic alcohol might be employed in the reaction mixture and indicated that isopropanol was preferred although other alcohols would also be suitable.

One object of the present invention is to provide an improved process for the dimerization of acrylonitrile compounds to give increased conversions and yields of the desired unsaturated dinitrile products.

Another object of the present invention is to provide an improved dimerization process involving certain specific operating conditions wherein increased conversions and yields of the desired unsaturated dinitrile products are attained.

A further object of the present invention is to provide an improved process for the dimerization of acrylonitrile with increased conversions and yields of 2-methylene glutaronitrile.

These and other objects of the invention will become readily apparent from the ensuing description and illustrative embodiments.

In accordance with the present invention, it has now been found that outstanding conversions and yields of the unsaturated dinitriles from the dimerization of acrylonitrile compounds can be achieved by utilizing a specific catalyst in conjunction with a certain solvent mixture. More particularly, it has been discovered that highly desirable increases in conversions and yields of the unsaturated dinitriles can be obtained by carrying out the dimerization with a tricycloalkyl phosphine as the catalyst in the presence of a solvent or solvent mixture. The tricycloalkyl phosphine catalyst is selected from the group consisting of tricyclopentyl, tricyclohexyl, tricycloheptyl, tris-(methylcyclohexyl), tricyclooctyl, tribornyl, trinorbornyl phosphines. As will be hereinafter demonstrated, the preferred catalyst is tricyclohexyl phosphine, and the present invention will be described and illustrated primarily in terms of utilizing this particular catalyst.

A variety of solvents may be employed in carrying out the improved dimerization process of this invention. Typical solvents include aromatic hydrocarbons such as benzene, p-xylene, o-xylene, m-xylene, toluene, ethylbenzene, cumene, cymene and the like having from 6 to 10 carbon atoms per molecule; aliphatic ketones having from 3 to 10 carbon atoms, such as acetone, methyl isobutyl ketone, methyl ethyl ketone, and the like; aliphatic ethers having from 4 to 12 carbon atoms, such as diethyl ether, diisopropyl ether, dibutyl ether; cyclic ethers having from 4 to 12 carbon atoms such as tetrahydrofuran, dioxane, isophorone, phorone, morpholine, n-methyl morpholine, and the like; acetonitrile; esters such as ethyl acetate, butyl acetate, and the like; and low molecular weight alkanols having from 2 to 12 carbon atoms such as ethanol, isopropanol, t-butanol, sec-butanol, t-amyl alcohol, sec-amyl alcohol, n-amyl alcohol, octyl alcohol, decyl alcohol, and the like.

It has also been found especially useful to employ a mixture of solvents comprising an alkanol and at least one of the other aforementioned solvents. In general, the total reaction mixture, will contain about 1 to 50% by volume of the alkanol and about 0 to 94% by volume of the other solvent. The preferred concentrations range from about 2 to 30% by volume of the alkanol and about 30 to 88% by volume of the other solvent. For most purposes, the amount of the total solvent mixture employed will range from about 5 to 95% by volume, preferably 60 to 90%, based on the total volume of the reaction mixture. Illustrative solvent mixtures include t-buanol in combination with benzene, p-xylene, acetonitrile, ether, or acetone; ethanol in combination with benzene; and isopropanol in combination with benzene. The use of t-butanol in conjunction with an aromatic hydrocarbon such as benzene is especially preferred.

The phosphine catalyst may be employed in amounts ranging from about 0.02 to 10% by weight, and preferably about 0.1 to 1% by weight, based on the weight of the acrylonitrile. Excess catalyst should be avoided since under such conditions increased amounts of undesirable polymer may be produced. It will be understood, however, that only catalytic amounts of the phosphine need be employed.

In accordance with another feature of this invention, it has been found useful to employ reaction temperatures which range from about 0° to 150° C., preferably from about 20° to 60° C. At lower temperatures conversions and yields of the desired unsaturated dinitrils drop off markedly. When higher temperatures are used conversions decrease with no significant change in the ratio of dimer to polymer.

The pressure employed in carrying out the improved dimerization process of this invention is not critical and may vary over a wide range. Thus, for example, the pressure may range from atmospheric to as high as 100 atmospheres without encountering undesirable results.

A polymerization inhibitor such as p-tertiarylbutyl catechol may also be employed in the reaction mixture. It will be understood, however, that the use of a polymerization inhibitor is not required in practicing the dimerization process of this invention. When an inhibitor is employed the amount may range from about 0.001 to 0.5% by weight based on the weight of the acrylonitrile compound employed as the starting material.

The dimerization reaction of this invention is generally accomplished in about 2 to 24 hours, and the reaction is preferably carried out in a time period of about 5 to 15 hours.

The acrylonitrile compounds which are especially useful as starting materials in the dimerization process are compounds having the formula:

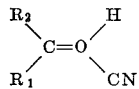

wherein $R_1$ and $R_2$ may be either hydrogen, alkyl radicals or aryl groups having 1 to 10 carbon atoms, or any radicals or groups having 1 to 10 carbon atoms. Although the preferred starting material is acrylontrile itself, other suitable acrylonitrile compounds include beta-substituted derivatives such as crotononitrile, cinnamonitrile, fumaronitrile, and the like. For purposes of convenience, the present invention will hereinafter be described and illustrated utilizing acrylonitrile as the starting material for the preparation of 2-methylene glutaronitrile. In general, the amount of acrylonitrile compound employed in the reaction mixture will range from about 5 to 95%, and preferably 10 to 40%, by volume based on the total volume of the reaction mixture.

In general, the improved dimerization process is carried out by rapidly adding the acrylonitrile, either alone or admixed with the solvent mixture, to a rapidly stirred, dilute solution of the catalyst in the absence of oxygen and water. The time required for the addition should be within the range of about 0.1 to 2 hours. It is also possible to add all of the catalyst at one time to the total mixture of acrylonitrile and solvent. During this period it is preferred to maintain the reaction temperature fairly constant and within the aforedisclosed range.

When the reaction is complete, the catalyst is neutralized by the addition of an acid, preferably an organic acid such as sebacic or propionic acids or by exposure to oxygen, e.g., exposure to air. The solvent mixture and unreacted acrylonitrile are then removed by distillation, with the temperature preferably being maintained below about 100° C. After removal of solvent, the dimer is distilled from the residue at a pressure of less than 20 mm. Hg.

It will be understood that the above method of recovering the unsaturated dimer from the reaction product mixture is not a critical feature of this invention and that other recovery methods may be employed without departing from the broad aspects of this invention. Moreover, recovery methods may be employed which include catalyst acrylonitrile and solvent mixture recycling.

The invention will be more fully understood by reference to the following illustrative embodiments.

EXAMPLE I

A series of runs, set forth in Table A, were carried out with the described catalysts, solvent systems, catalyst concentrations and temperatures. Comparative results are indicated by the conversion, given in grams per gram of catalyst, and the yields of 2-methylene glutaronitrile (MGN) and by-product polymer, also expressed in grams per gram of catalyst.

The dimerization process involved admixing the acrylonitrile and solvent in an amber bottle, flushing with nitrogen, then adding the catalyst by injection through a serum stopper; one ml. of a solution of the catalyst in benzene to 50 ml. of the acrylonitrile solution. The mixture was allowed to stand in a water bath after an initial brief mixing. After 24 hours the solution was analyzed by gas chromatography for MGN content and acrylonitrile content. The difference betwen the sum of these two and the initial acrylonitrile content was ascribed to polymer.

TABLE A.—ACRYLONITRILE (AN) AND SOLVENTS, PERCENT VOLUME

| | 1 | 2 | 3 | 4 | 5 | 6 | 7 | 8 |
|---|---|---|---|---|---|---|---|---|
| | AN (22%) Benzene (78%) | AN (30%) Benzene (70%) | AN (22%) p-Xylene (78%) | AN (30%) Acetonitrile (70%) | AN (30%) Acetone (70%) | AN (22%) t-Butanol (78%) | AN (30%) Benzene (55%) Ethanol (15%) | AN (30%) Benzene (65%) Isopropanol (15%) |
| Tricyclohexyl phosphine: | | | | | | | | |
| Cat. conc., gm./100 ml | .048 | | .048 | .06 | .06 | .048 | .06 | .06 |
| Temperature, ° C | 25 | | 25 | 25 | 25 | 25 | 25 | 25 |
| Conversion, gm./gm. cat | 193 | | 151 | 191 | 257 | 112 | ¹287 | 227 |
| Yield, gm./gm. cat.: | | | | | | | | |
| MGN | 139 | | 103 | 89 | 221 | 100 | 138 | 208 |
| Polymer | 54 | | 47 | 102 | 36 | 12 | 55 | 14 |
| Tri (n-Butyl) phosphine: | | | | | | | | |
| Cat. conc., gm./100 ml | .35 | | .35 | .198 | .198 | | .198 | .198 |
| Temperature, ° C | 25 | | 25 | 25 | 25 | | 25 | 25 |
| Conversion, gm./gm. cat | 12 | | | 11.0 | 11.0 | | ¹48 | |
| Yield, gm./gm. cat.: | | | | | | | | |
| MGN | 9.0 | | 8.3 | 3.6 | 3.8 | | 9.3 | 8.2 |
| Polymer | 3 | | | 7.5 | 7.3 | | 2.7 | |
| Tri (n-Octyl) phosphine: | | | | | | | | |
| Cat. conc., gm./100 ml | | | | .201 | .201 | | .201 | .201 |
| Temperature, ° C | | | | 25 | 25 | | 25 | 25 |
| Conversion, gm./gm. cat | | | | 23.3 | 45.0 | | ¹32 | 13.4 |
| Yield, gm./gm., cat.: | | | | | | | | |
| MGN | | | | .5 | 1.0 | | 1.1 | 1.1 |
| Polymer | | | | 22.8 | 44.0 | | 5.5 | 12.0 |
| Triethyl phosphine: | | | | | | | | |
| Cat. conc., gm./100 ml | | | | | | | .24 | |
| Temperature, ° C | | | | | | | 25 | |
| Conversion, gm./gm. cat | | | | | | | | |
| Yield, gm./gm., cat.: | | | | | | | | |
| MGN | | | | | | | 15 | |
| Polymer | | | | | | | | |
| Tricyclopentyl phosphine: | | | | | | | | |
| Cat. conc., gm./100 ml | | 0.2 | | 0.2 | 0.2 | | | |
| Temperature, ° C | | 25 | | 25 | 25 | | | |
| Conversion, gm./gm. cat | | 78 | | 40 | 36 | | | |
| Yield, gm./gm. cat.: | | | | | | | | |
| MGN | | 24 | | 18 | 24 | | | |
| Polymer | | 54 | | 22 | 12 | | | |
| Tricycloheptyl phosphine: | | | | | | | | |
| Cat. conc., gm./100 ml | | 0.2 | | 0.2 | 0.2 | | | |
| Temperature, ° C | | 25 | | 25 | 25 | | | |
| Conversion, gm./gm. cat | | 85 | | 52 | 78 | | | |
| Yield, gm./gm. cat.: | | | | | | | | |
| MGN | | 23 | | 33 | 51 | | | |
| Polymer | | 62 | | 19 | 27 | | | |
| Tricyclooctyl phosphine: | | | | | | | | |
| Cat. conc., gm./100 ml | | 0.2 | | 0.2 | 0.2 | | | |
| Temperature, ° C | | 25 | | 25 | 25 | | | |
| Conversion, gm./gm. cat | | 62 | | 41 | 56 | | | |
| Yield, gm./gm. cat.: | | | | | | | | |
| MGN | | 31 | | 22 | 45 | | | |
| Polymer | | 31 | | 19 | 11 | | | |

TABLE A—Continued

| | 9 | 10 | 11 | 12 | 13 | 14 | 15 |
|---|---|---|---|---|---|---|---|
| | AN (30%) Benzene (55%) t-Butanol (15%) | AN (30%) p-Xylene (55%) t-Butanol (15%) | AN (30%) Acetonitrile (55%) t-Butanol (15%) | AN (30%) Ether (70%) | AN (30%) Acetone (55%) t-Butanol (15%) | AN (30%) MIBK (70%) | AN (30%) Ether (55%) t-Butanol (15%) |
| Tricyclohexyl phosphine: | | | | | | | |
| Cat. conc., gm./100 ml | .042 | .06 | .12 | | .12 | .06 | .12 |
| Temperature, °C | 25 | 25 | 25 | | 25 | 25 | 25 |
| Conversion, gm./gm. cat | 340 | 382 | 130 | | 156 | 184 | 178 |
| Yield, gm./gm. cat.: | | | | | | | |
| MGN | 280 | 239 | 105 | | 128 | 50 | 128 |
| Polymer | 60 | 143 | 25 | | 28 | 134 | 50 |
| Tri (n-Butyl) phosphine: | | | | | | | |
| Cat. conc., gm./100 ml | .184 | .198 | .198 | | .198 | .198 | .198 |
| Temperature, °C | 25 | 25 | 25 | | 25 | 25 | 25 |
| Conversion, gm./gm. cat | 15.7 | 11.1 | 6.1 | | 7.1 | 26.3 | 32.4 |
| Yield, gm./gm. cat.: | | | | | | | |
| MGN | 8 | 7.9 | 1.8 | | 3.7 | 8.3 | 4.7 |
| Polymer | 7.7 | 3.2 | 4.3 | | 3.4 | 18.0 | 27.7 |
| Tri (n-Octyl) phosphine: | | | | | | | |
| Cat. conc., gm./100 ml | .191 | .201 | .201 | | .201 | .201 | .201 |
| Temperature, °C | 25 | 25 | 25 | | 25 | 25 | 25 |
| Conversion, gm./gm. cat | 9.5 | 3.1 | 4.1 | | 12.0 | 14.7 | 12.6 |
| Yield, gm./gm. cat.: | | | | | | | |
| MGN | 3.2 | 1.7 | 0.2 | | 0.9 | 1.4 | 2.1 |
| Polymer | 6.3 | 1.4 | 3.9 | | 11.1 | 13.3 | 10.5 |
| Triethyl phosphine: | | | | | | | |
| Cat. conc., gm./100 ml | | | | | | .067 | .067 |
| Temperature, °C | | | | | | 25 | 25 |
| Conversion, gm./gm. cat | | | | | | 34 | 63 |
| Yield, gm./gm. cat.: | | | | | | | |
| MGN | | | | | | 15 | 41 |
| Polymer | | | | | | 19 | 22 |
| Tricyclopentyl phosphine: | | | | | | | |
| Cat. conc., gm./100 ml | .02 | | .02 | .02 | | | |
| Temperature, °C | 25 | | 25 | 25 | | | |
| Conversion, gm./gm. cat | 54 | | 21 | 67 | | | |
| Yield, gm./gm. cat.: | | | | | | | |
| MGN | 36 | | 8 | 31 | | | |
| Polymer | 18 | | 13 | 36 | | | |
| Tricycloheptyl phosphine: | | | | | | | |
| Cat. conc., gm./100 ml | 0.2 | | 0.2 | 0.2 | | | |
| Temperature, °C | 25 | | 25 | 25 | | | |
| Conversion, gm./gm. cat | 116 | | 79 | 94 | | | |
| Yield, gm./gm. cat.: | | | | | | | |
| MGN | 82 | | 70 | 37 | | | |
| Polymer | 34 | | 9 | 57 | | | |
| Tricyclooctyl phosphine: | | | | | | | |
| Cat. conc., gm./100 ml | 0.2 | | 0.2 | 0.2 | | | |
| Temperature, °C | 25 | | 25 | 25 | | | |
| Conversion, gm./gm. cat | 106 | | 68 | 55 | | | |
| Yield, gm./gm. cat.: | | | | | | | |
| MGN | 88 | | 55 | 23 | | | |
| Polymer | 18 | | 13 | 33 | | | |

[1] Total conversion includes cyanoethylated alcohol.

The above data show that markedly increased conversions and 2-methylene glutaronitrile yields are achieved by utilizing the tricyclohexyl phosphine. See columns 9 and 10 where the especially preferred solvent mixtures of this invention was imployed with a variety of phosphine catalysts and, aside from the tricycloalkyl phosphine catalysts, conversions and yields were considerably lower than attained with other solvent systems. The data further show that when the tricycloalkyl phosphine catalysts are employed with solvents or solvent mixtures other than the admixture of an aromatic hydrocarbon and tertiary butanol the conversions and yields of the desired dimer product were far superior than those obtained when utilizing trialkyl phosphines.

EXAMPLE II

A second series of runs was carried out with varying amounts of tertiary butanol and aromatic hydrocarbon, e.g. benzene, in the dimerization reaction mixture using tricyclohexyl phosphine as the catalyst. The amount of acrylonitrile was kept fairly constant, while the dimerization temperature was maintained either at 20° C. or 40° C.

The dimerization process and the product recovery method of Example I were utilized. The specific operating conditions and the results obtained are set forth in the following table.

TABLE B

| | Reaction Mixture, percent Vol. | | | Temp., °C. | Conversion (gm./gm. cat.) | Yield (gm./gm. cat.) | | Selectivity, percent | |
|---|---|---|---|---|---|---|---|---|---|
| | t-butanol | Benzene | AN | | | MGN | Polymer | MGN | Polymer |
| Run: | | | | | | | | | |
| (1) | 30 | 40 | 30 | 20 | 129 | 121 | 8 | 94 | 6 |
| (2) | 22 | 49 | 29 | 20 | 251 | 225 | 26 | 90 | 10 |
| (3) | 14 | 55 | 31 | 20 | 268 | 241 | 27 | 90 | 10 |
| (4) | 10 | 58 | 32 | 20 | 317 | 268 | 31 | 90 | 10 |
| (5) | 6 | 62 | 32 | 20 | 368 | 309 | 59 | 84 | 16 |
| (6) | 3 | 70 | 27 | 20 | 343 | 288 | 55 | 84 | 16 |
| (7) | 0 | 70 | 30 | 20 | 91 | 57 | 34 | 63 | 37 |
| (8) | 14 | 54 | 32 | 40 | 423 | 341 | 82 | 81 | 19 |
| (9) | 9 | 60 | 31 | 40 | 391 | 315 | 76 | 80 | 20 |
| (10) | 6 | 62 | 32 | 40 | 335 | 284 | 51 | 85 | 15 |

The above data show that the reaction mixture preferably should contain about 2 to 30% tertiary butanol and about 30 to 88% of aromatic hydrocarbon, the percentages being by volume and based on the total volume of the reaction mixture. Conversions and selectivities for the 2-methylene glutaronitrile were particularly outstanding with about 3 to 15% by volume tertiary butanol and about 55 to 70% benzene. When larger amounts of tertiary butanol are employed the selectivity is somewhat better, but the conversion dropped off markedly. On the other hand, when smaller amounts of the tertiary butanol were used selectivity decreased and the amount of by-product polymer formed increased. Run 7 further demonstrates that in the absence of the tertiary butanol the conversion and selectivity were somewhat lower than when the preferred solvent mixture was utilized.

EXAMPLE III

A third series of runs was carried out utilizing the dimerization process with tricyclohexyl phosphine as the catalyst and the 2-methylene glutaronitrile recovery procedure of Example I but varying the dimerization reaction temperature. The operating conditions and results are tabulated below.

The foregoing data demonstrate that the preferred reaction temperature is within the range of about 20° to 60° C. At lower temperatures the conversion values are noticeably reduced; whereas at higher temperatures, although the rate increases, total conversion decreases. At reflux temperatures (74° C.) conversion is about one-third of that obtained at 40° C.

While particular embodiments of this invention are shown above, it will be understood that the invention is obviously subject to variations and modifications without departing from its broader aspects.

What is claimed is:

1. The process for the production of 2-methyleneglutaronitrile which comprises dimerizing acrylonitrile in the presence of a polymerization inhibitor and in the presence of a catalytic amount of tricyclohexylphosphine.

2. The process of claim 1 wherein the polymerization inhibitor is employed in an amount ranging from about 0.001 to 0.5% by weight based on the weight of acrylonitrile.

3. The process for the production of 2-methyleneglutaronitrile which comprises dimerizing acrylonitrile in the presence of t-butyl catechol as a polymerization inhibitor and in the presence of a catalytic amount of tricyclohexylphosphine.

TABLE C

| Run: | Temp., °C. | Cat. conc. (gm./100 ml.) | Reaction Mixture, Percent Volume | | | Conversion (gm./gm. cat.) | Yield MGN (gm./gm. cat.) | Selectivity, Percent | |
|---|---|---|---|---|---|---|---|---|---|
| | | | t-Butanol | Benzene | AN | | | MGN | Polymer |
| (1) | 0.5 | .041 | 18 | 72 | 11 | 107 | 97 | 89 | 11 |
| (2) | 15 | .043 | 13 | 54 | 32 | 169 | 151 | 90 | 10 |
| (3) | 20 | .042 | 14 | 54 | 31 | 268 | 241 | 90 | 10 |
| (4) | 30 | .042 | 15 | 56 | 28 | 332 | 286 | 86 | 14 |
| (5) | 40 | .042 | 14 | 53 | 31 | 423 | 341 | 81 | 19 |
| (6) | 50 | .043 | 14 | 56 | 30 | 338 | 286 | 85 | 15 |
| (7) | 74 | .03 | 12 | 60 | 24 | 136 | 135 | 98 | 2 |

References Cited

FOREIGN PATENTS 1,366,081  6/1964  France.

OTHER REFERENCES

Takashina et al., J.A.C.S., 84 (Feb. 5, 1962), pp. 489–481.

JOSEPH P. BRUST, Primary Examiner

U.S. Cl. X.R.

260—465